United States Patent
Guering et al.

(10) Patent No.: US 10,399,667 B2
(45) Date of Patent: Sep. 3, 2019

(54) CURVILINEAR RUDDER BAR FOR AN AIRCRAFT AND AIRCRAFT COMPRISING SUCH A CURVILINEAR RUDDER BAR

(71) Applicant: Airbus Operations SAS, Toulouse (FR)

(72) Inventors: Bernard Guering, Montrabe (FR); Laurent Saint-Marc, Montaigut sur Save (FR)

(73) Assignee: Airbus Operations SAS (FR)

( * ) Notice: Subject to any disclaimer, the term of this patent is extended or adjusted under 35 U.S.C. 154(b) by 363 days.

(21) Appl. No.: 15/370,037

(22) Filed: Dec. 6, 2016

(65) Prior Publication Data

US 2017/0166296 A1 Jun. 15, 2017

(30) Foreign Application Priority Data

Dec. 11, 2015 (FR) ...................... 15 62207

(51) Int. Cl.
| | |
|---|---|
| B64C 13/04 | (2006.01) |
| B64C 13/12 | (2006.01) |
| B64C 13/06 | (2006.01) |
| G05G 1/36 | (2008.04) |
| B64C 13/08 | (2006.01) |
| B64C 25/44 | (2006.01) |

(52) U.S. Cl.
CPC ............ B64C 13/044 (2018.01); B64C 13/06 (2013.01); B64C 13/12 (2013.01); G05G 1/36 (2013.01); *B64C 13/08* (2013.01); *B64C 25/44* (2013.01)

(58) Field of Classification Search
CPC ....... B64C 13/04; B64C 13/044; B64C 13/06; B64C 13/08; B64C 13/12; B64C 13/042; B64C 13/0421; B64C 13/0423; B64C 13/0425; B64C 13/0427; B60T 7/00
USPC ..................................... 74/539, 542
See application file for complete search history.

(56) References Cited

U.S. PATENT DOCUMENTS

| | | | | |
|---|---|---|---|---|
| 1,333,535 A | * | 3/1920 | Bopp ...................... | B60R 25/04 |
| | | | | 74/539 |
| 2,420,528 A | * | 5/1947 | Eaton, Jr. ................ | B64C 13/04 |
| | | | | 244/235 |
| 3,359,821 A | | 12/1967 | Beardsley et al. | |

(Continued)

FOREIGN PATENT DOCUMENTS

| | | | | |
|---|---|---|---|---|
| EP | 1918195 A1 | | 5/2008 | |
| EP | 3124378 A1 | * | 2/2017 | ............. B64C 13/06 |

(Continued)

OTHER PUBLICATIONS

FR 15 62207 Search Report dated Jul. 29, 2016.

*Primary Examiner* — Magdalena Topolski
(74) *Attorney, Agent, or Firm* — Lerner, David, Littenberg, Krumholz & Mentlik, LLP (57) ABSTRACT

The rudder bar includes two actuation arrangements, each provided with two pedals, each actuation arrangement having a frame provided with two rails arranged on either side of said frame and being in the form of a concave curve, and, associated with each one of said rails, a movable carriage, each one of said movable carriages bearing one of said pedals, each one of said movable carriages being configured such that it can be moved on the associated rail, for a direction command, under an action exerted by at least one foot of a pilot on at least one of said pedals.

12 Claims, 6 Drawing Sheets

(56) References Cited

U.S. PATENT DOCUMENTS

| | | | | |
|---|---|---|---|---|
| 3,576,302 A | * | 4/1971 | Palfreyman | B64C 13/24 244/196 |
| 4,484,722 A | * | 11/1984 | Larson | B64C 13/06 244/122 R |
| 5,056,742 A | | 10/1991 | Sakurai | |
| 2008/0105790 A1 | * | 5/2008 | Christensen | B64C 13/06 244/235 |
| 2011/0108674 A1 | * | 5/2011 | Gardner | B64C 13/04 244/235 |
| 2014/0131523 A1 | * | 5/2014 | Carner | B64C 13/04 244/235 |
| 2014/0251066 A1 | * | 9/2014 | Stachniak | B64C 13/06 74/512 |
| 2016/0348772 A1 | * | 12/2016 | Petrou | F16H 25/12 |
| 2017/0113784 A1 | * | 4/2017 | Guering | B64C 13/04 |
| 2017/0217567 A1 | * | 8/2017 | Huynh | B64C 13/14 |
| 2017/0283037 A1 | * | 10/2017 | Guering | B64C 13/04 |

FOREIGN PATENT DOCUMENTS

| | | | | |
|---|---|---|---|---|
| FR | 2721120 A1 | * | 12/1995 | B60W 30/18 |
| FR | 2956756 A1 | * | 8/2011 | B64C 13/04 |
| WO | 2014/138014 A1 | | 9/2014 | |

\* cited by examiner

CURVILINEAR RUDDER BAR FOR AN AIRCRAFT AND AIRCRAFT COMPRISING SUCH A CURVILINEAR RUDDER BAR

FIELD OF THE INVENTION

The present invention relates to a rudder bar, said to be curvilinear, for an aircraft, in particular for a transport airplane, and to an aircraft comprising such a curvilinear rudder bar.

BACKGROUND OF THE INVENTION

In an aircraft, a rudder bar is a mechanical device by means of which the pilot and co-pilot can control the rudder and the wheel brakes.

The rudder bar comprises pedals and an arrangement of moving parts which, depending on the type of movements applied to the pedals by the pilot or pilots, control the rudder or the brakes of the aircraft.

The rudder bars used in aircraft are principally, in airliners, rudder bars integrated into the floor of the cockpit and even passing through the floor. The rudder bar is said to be laid as it rests on the floor of the cockpit.

Attachment of the rudder bar and transmission of the commands from the rudder bar to the rudder and/or the brakes take place beneath the floor of the cockpit. This architecture is the result of a choice of communicating, in the case of a rudder bar that is mechanically connected to the elements to be controlled (in particular the rudder), via the underfloor region (connections by means of rods, rotary selectors and cables), which is more easily effected in an aircraft.

For operation, the rudder bar must comprise a great number of parts (articulations, rods, pivots, etc.).

A conventional rudder bar of this type, due in particular to this large number of parts, is complex and is not optimal particularly in terms of volume, mass and cost.

Therefore, this conventional solution is not entirely satisfactory.

BRIEF SUMMARY OF THE INVENTION

The present invention provides for a novel rudder bar architecture, by means of which it may be possible to remedy this drawback. It relates to a rudder bar for an aircraft, said rudder bar comprising at least one actuation arrangement provided with two pedals.

According to an embodiment of the invention, said actuation arrangement comprises:
 at least one frame, said frame being provided with two rails, each one of said rails being in the form of a concave curve; and
 associated with each one of said rails, a movable carriage, each one of said movable carriages bearing one of said pedals, each one of said movable carriages being configured such that it can be moved on the associated rail, for a direction command, under an action exerted by at least one foot of a pilot on at least one of said pedals.

Thus, this frame provided with curved (or curvilinear) rails on which the movable carriages bearing the pedals are able to move, results in a simplified architecture with a reduced number of parts, as set out hereinbelow. This architecture has advantages in particular in terms of volume, mass and cost, such that it may be possible to remedy the above-mentioned drawback.

Preferably, said frame has an elongate general shape and/or is provided with structural tubes, preferably made of carbon-based composite material.

In addition, advantageously, each one of said movable carriages is connected to a cylinder arranged along (and preferably above) the associated rail.

In one embodiment, each one of said movable carriages is provided with an arrangement of rollers that are mounted so as to be able to rotate and are configured so as to be able to move on the associated rail.

Furthermore, advantageously, said actuation arrangement comprises an adjustment arrangement that is configured so as to allow an operator to modify the neutral positions of the pedals.

Furthermore, advantageously, said actuation arrangement also comprises a reel for hydraulic hoses.

Furthermore, advantageously, said frame is provided with an attachment arrangement, said attachment arrangement comprising two rods secured at right angles with respect to one another at one end, referred to as the front end, of the frame, and a connecting fitting that is provided with a stiffening rod and is secured to the other end, referred to as the rear end, of the frame.

Furthermore, in one particular embodiment, each one of said pedals is mounted so as to be able to rotate on the associated movable carriage for a braking command. Advantageously, each one of said pedals is connected to a hydraulic cylinder and to a connecting arm, forming an articulated triangle.

Furthermore, advantageously, said actuation arrangement comprises hydraulic fluid-transfer devices for at least one of the following commands: a direction command and a braking command.

In one preferred embodiment, for an aircraft that can be flown by two pilots, the rudder bar comprises two actuation arrangements, one assigned to a first pilot and the other assigned to a second pilot, the two actuation arrangements being connected to one another at least by coordinating means.

The present invention also relates to an aircraft, in particular a transport airplane, which is provided with a rudder bar such as that specified hereinabove.

In one preferred embodiment, for an aircraft comprising a cockpit provided with a floor, said frame is positioned such that its rear end, located to the rear with respect to the direction of flight of the aircraft, is raised above the floor of the cockpit.

Furthermore, advantageously, said frame is secured at its front end, via two rods arranged at right angles with respect to one another, to at least one support element, and at its rear end, via a connecting fitting, to a joist of the floor of the cockpit, the connecting fitting being provided with a stiffening rod.

BRIEF DESCRIPTION OF THE DRAWINGS

The appended figures will make it easy to understand how the invention may be embodied. In these figures, identical references denote elements that are similar. More particularly.

DETAILED DESCRIPTION

Figure 1:
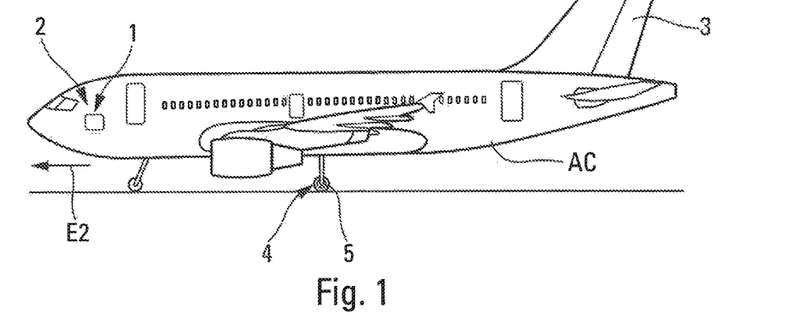
FIG. 1 shows an airplane on the ground, comprising a rudder bar according to one embodiment of the invention.

FIG. 1 shows an aircraft AC, in this case a transport aircraft, which comprises a cockpit 2 in which is arranged a rudder bar 1 according to an embodiment of the invention (as shown very schematically in this FIG. 1). The aircraft AC also comprises a rudder 3 and brakes 4 at the wheels 5 of a main landing gear of the aircraft AC.

Figure 2:
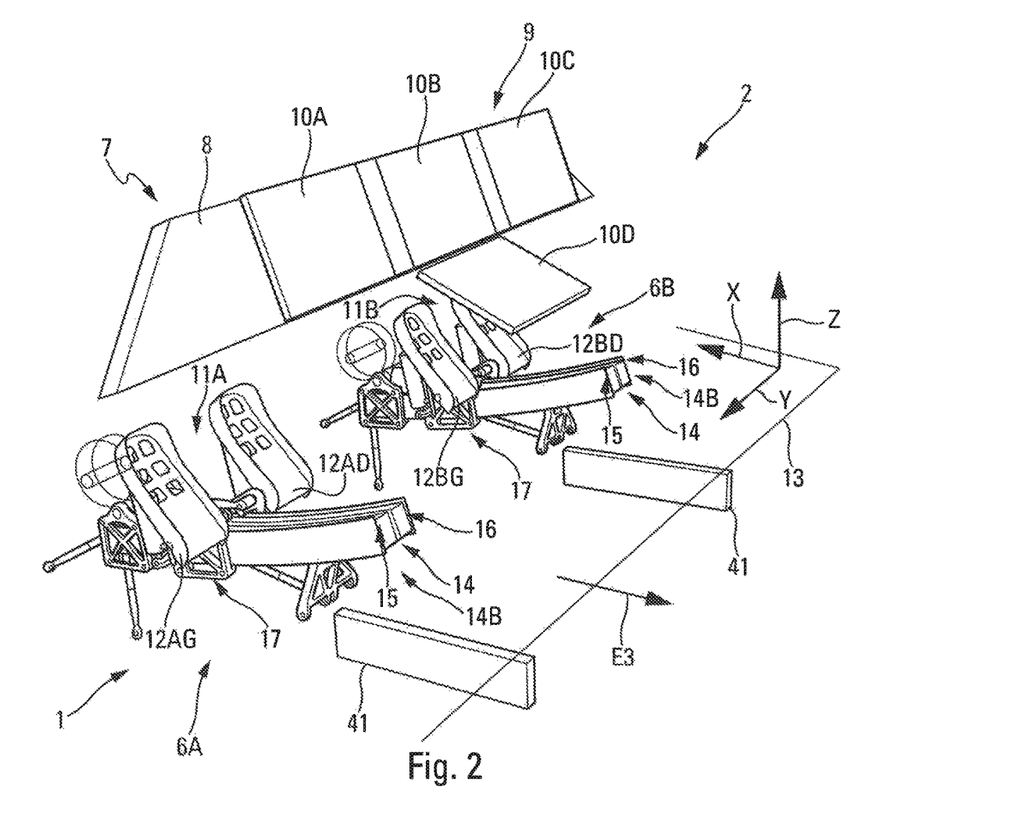
FIGS. 2 and 3 are perspective views, respectively from behind and from in front, of a cockpit of an aircraft, provided with a rudder bar according to one embodiment of the invention.
Figure 3:
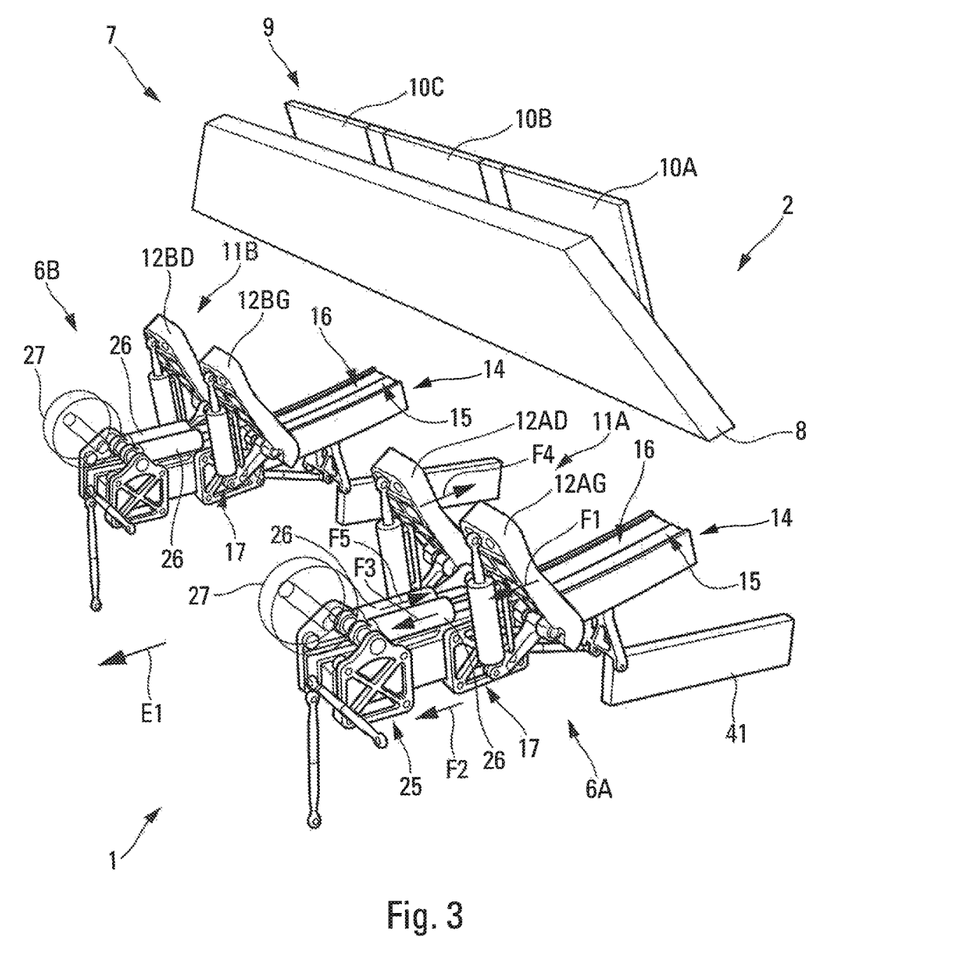

FIGS. 2 and 3 show a rudder bar 1 according to a preferred embodiment of the invention, which is arranged in the cockpit 2 of the aircraft AC (only a small part of which is shown).

More precisely, these FIGS. 2 and 3 show, in a clean, schematic manner, a dashboard 7 provided with a support structure 8 and with an array 9 of screens or displays 10A, 10B, 10C and 10D, which are usual for the cockpit 2.

In the context of the present invention, the directions "back/rear" and "forward/front" are defined with respect to the longitudinal direction of the aircraft AC, with "forward" being as illustrated in FIG. 3 by an arrow E1 toward the front of the aircraft AC (in the direction of an arrow E2 in FIG. 1), and "back" as shown in FIG. 2 by the arrow E3 toward the rear of the aircraft AC.

Furthermore, within the context of the present description, the terms "lower", "upper", and "top" are defined along a vertical directional Z which is orthogonal to a horizontal plane of the aircraft defined by the floor 13 (FIG. 2).

Figure 7A:
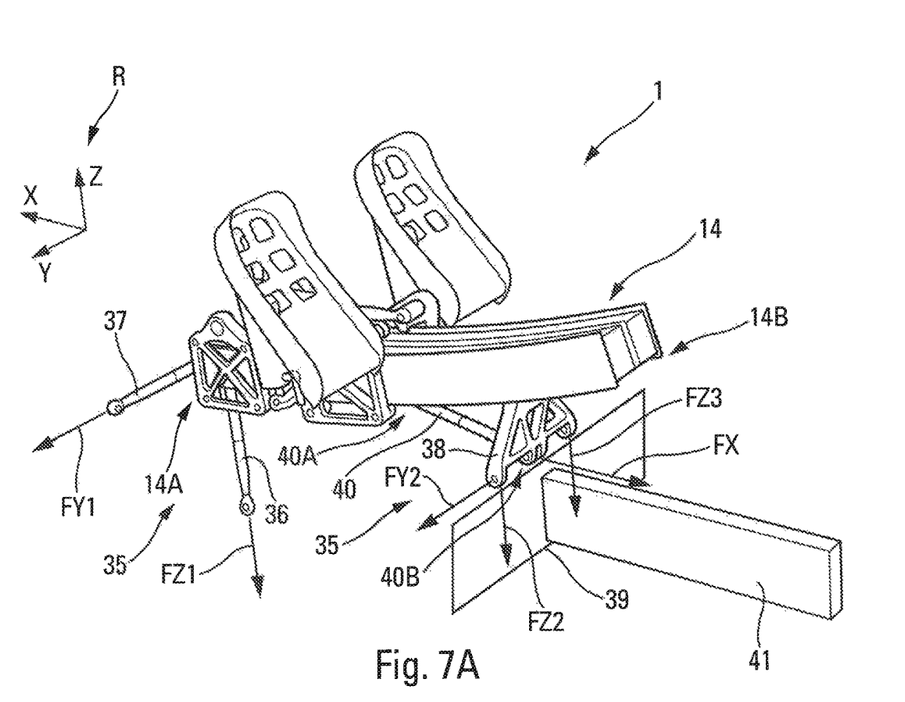
FIGS. 7A and 7B are two views, respectively a perspective view and a plan view, of a curvilinear rudder bar.

Furthermore, as an aid to the description, FIGS. 2 and 7A show a reference system R (XYZ) having:
- a longitudinal direction X along the longitudinal axis of the aircraft;
- the vertical direction Z, the vertical direction Z forming with the horizontal direction X a plane XZ that is parallel to a vertical plane of symmetry of the aircraft; and
- a lateral direction Y that is orthogonal to said directions X and Z, the lateral direction Y forming with the direction X a plane XY which is parallel to the floor 13 of the cockpit 2 (FIG. 2).

The rudder bar 1 shown in FIGS. 2 and 3, which is designed for a conventional transport airplane, is able to be controlled by two pilots, a main pilot and a co-pilot.

To that end, the rudder bar 1 comprises two pairs of pedals 11A and 11B, which respectively form part of actuation arrangements 6A and 6B.

A first pair of pedals 11A (of the actuation arrangement 6A), arranged on the left when looking forwards, is intended for the pilot of the aircraft. This pair 11A comprises two pedals 12AD and 12AG designed to be actuated respectively by the right and left feet of the pilot.

The second pair of pedals 11B (of the actuation arrangement 6B), arranged on the right, is intended for the co-pilot of the aircraft. This pair 11B comprises two pedals 12BD and 12BG designed to be actuated respectively by the right and left feet of the co-pilot.

Thus, the rudder bar 1 comprises two actuation arrangements 6A and 6B. Each one of said actuation arrangements 6A and 6B, of which one is thus intended for the pilot of the aircraft and the other is intended for the co-pilot, is therefore provided with a pair 11A, 11B of pedals.

According to an embodiment of the invention, each one of said actuation arrangements 6A and 6B also comprises, as shown in FIGS. 2 and 3:
- at least one frame 14. The frame 14 is provided with two rails 15 and 16 arranged on either side of said frame 14, each one of said rails 15 and 16 being in the form of a concave curve; and
- associated with each one of said rails 15 and 16 is a movable carriage 17. Each one of said movable carriages 17 bears one of said pedals 12AG, 12AD, 12BG, 12BD. In addition, each one of said movable carriages 17 is configured such that it can be moved on the associated rail 15, 16, for a direction command, under an action exerted by a foot of a pilot on the associated pedal, as set out hereinbelow.

Thus, in particular this curved (or curvilinear) frame 14, on which the two movable carriages 17 bearing the pedals of an actuation arrangement 6A, 6B are able to move, results in a simplified architecture for a rudder bar 1 with a reduced number of parts, as set out hereinbelow. This architecture has advantages in particular in terms of volume, mass and cost.

In one preferred embodiment, the entire frame 14 is elongate and is in the general shape of a concave curve.

To that end, each frame 14 is fixed in the XZ plane, having a general direction in X while having a concave curvature in the XZ plane such that the rear end 14B of the frame 14 (raised above the floor 13 laid on conventional structural elements 41 (FIG. 2)) moves vertically upward away from said floor 13, along the Z direction.

This curvature has the advantage of being able to position the pedals in the most ergonomic fashion possible, depending on the height of the pilots. Indeed, in a cockpit, the position of the pilots is defined with respect to the surrounding windshield frames (external visibility) and with respect to the instrument displays (internal visibility angles). For that reason, a tall pilot has a lower seat position and more retracted pedal positions and, from an ergonomic point of view, these pedals must be positioned more vertically than for a short pilot, in order to ensure a natural angle between the legs and the feet. Conversely, a short pilot has a higher seat position and the pedals must be positioned more horizontally. A pilot of medium height requires pedals that are positioned between the extreme values. In a conventional articulated mechanical rudder bar, these various positions are obtained precisely by means of a complex pedal positioning movement by means of a deformable parallelogram that precisely retracts the pedals depending on the ergonomics (principally the height) of the pilots. This usually complex function is effected with great simplicity in the curvilinear rudder bar: it is the simple curvature of the curvilinear rudder bar which provides an ergonomic position for the movable assembly of the pedals that is suited to the users.

Figure 5:
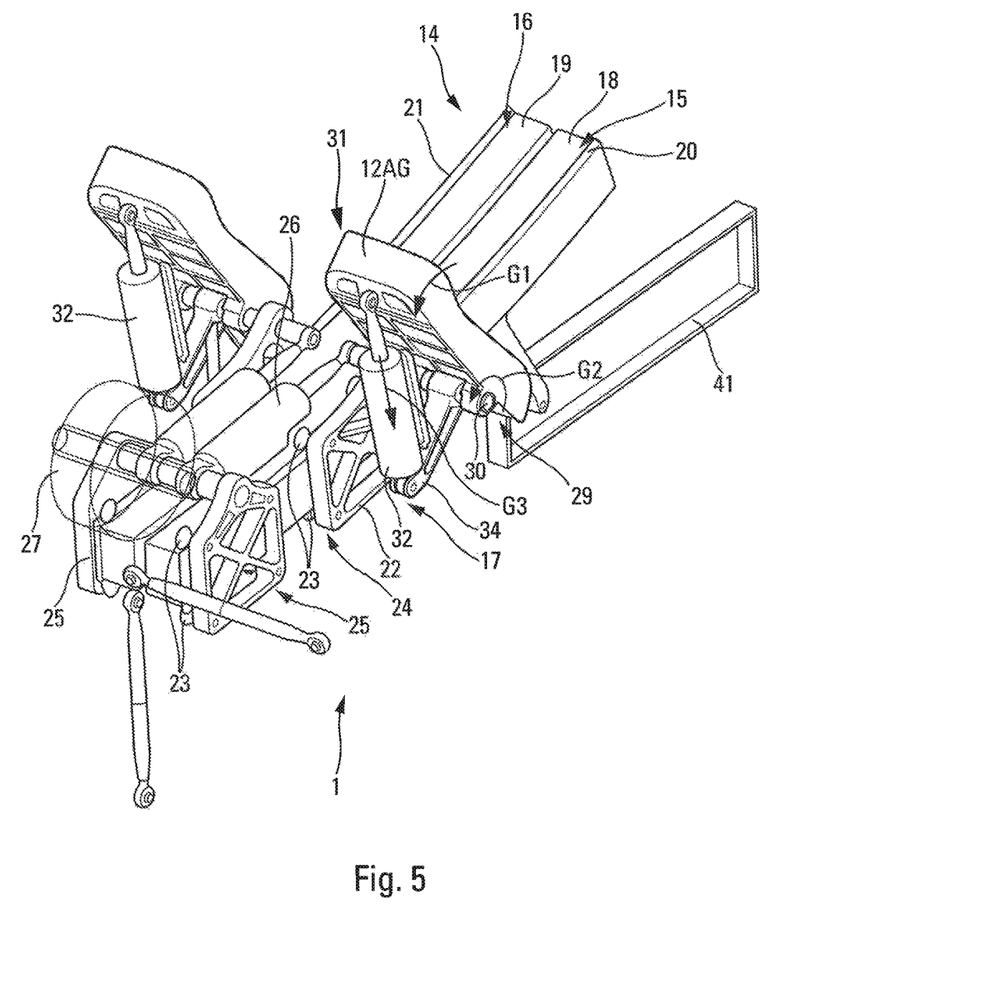
FIGS. 5 and 6 are perspective views, respectively in an assembled position and in an exploded position, of an actuation arrangement of a rudder bar.

Furthermore, as shown in FIG. 5, the frame 14 is provided with structural tubes 18 and 19, preferably made of carbon composite, which thus have reduced mass and great mechanical strength.

In the particular embodiment shown in FIG. 5, the chassis 14 comprises two structural tubes 18 and 19, of square or rectangular cross section, which are fixed longitudinally (in the XZ plane) against one another.

The frame 14 also comprises, longitudinally and on either side of the structural tubes 18 and 19, a lateral plate 20, 21 that serves as a mount for the guiding rail 15, 16.

This curvilinear frame 14 has great mechanical strength and is able to withstand substantial forces due to the presence of large-cross-section structural tubes made of carbon composite, and above all due to the absence of a lever arm effect. Indeed, the forces are exerted directly close to the connecting or guiding elements, in contrast to a conventional architecture of the pivoted (or articulated) type.

In the above-described preferred embodiment, the two rails intended for a pilot are borne by a single frame. As a variant, it is also possible to provide one frame per rail.

In this particular embodiment, each one of said movable carriages 17 comprises a rectangular- or square-type structure 22 provided with four rollers 23 arranged at the corners of this structure 22, for example at the corners 24 as shown in FIG. 5.

These rollers 23 are mounted so as to be able to rotate and are configured so as to be able to move on the associated rail 15, 16. The four rollers 23 are mounted so as to be able to roll on the frame 14, specifically two rollers on the upper face and two rollers on the lower face. The rollers 23 are held on the frame 14 via the intermediary of the lateral plate 20, 21 which projects with respect to the upper portion and the lower portion of the associated structural tube 18, 19.

Thus, the frame 14 comprises rollers 23 and rails 15, 16 having a guiding flange, preferably made of metal, for example made of aluminum with a bearing region made of hard metal.

Using rollers for guiding, in particular for guiding the carriage 17, provides precise and reliable guiding, with precise play.

Figure 6:
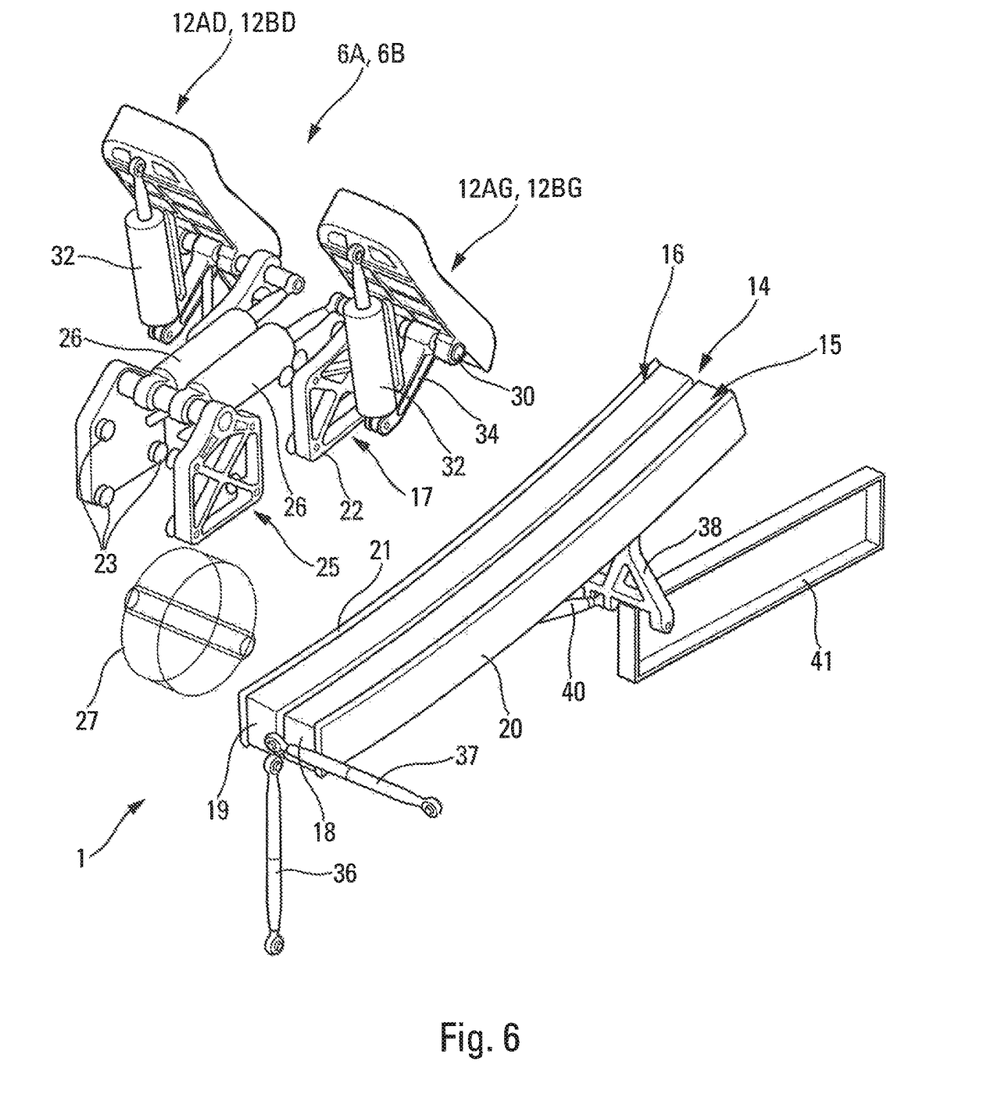

In addition, the actuation arrangement 6A, 6B comprises, associated with each movable carriage 17, an auxiliary structure 25 having a structure that is similar (to the structure 22) and is provided with four rollers 23. The auxiliary structure 25 is connected to the movable carriage 17 via a hydraulic cylinder 26, as shown in FIG. 5 (or FIG. 6, which is an exploded view of FIG. 5). The auxiliary structure 25 is arranged at the front end of the rail.

The hydraulic cylinder 26 is arranged along the rail 15, 16, and more precisely along and above the corresponding structural tube 18, 19 of the rail 15, 16. The hydraulic cylinder 26 is therefore connected, at one of its ends, to the auxiliary structure 25 (at the front of the rail). Furthermore, the hydraulic cylinder 26 is connected, at its other end, to an axis of rotation 30 of the pedal, as set out hereinbelow. In particular, this contributes to the simplicity and the compactness of the actuation arrangement.

Actuation of a pedal, for example 12AG, in the direction illustrated by an arrow F1 in FIG. 3, under the action of pressure exerted by the pilot via his or her foot, causes the movable carriage 17 to move with respect to the auxiliary structure 25, in the direction indicated by an arrow F2. This movement toward the auxiliary structure 25 causes compression of the associated hydraulic cylinder 26, as illustrated by an arrow F3. The amplitude of this compression is used to determine the order of the direction command.

Conversely, releasing the action generated by the foot of the pilot causes the movable carriage 17 to move in the opposite direction to that illustrated by the arrow F1, under the action of the cylinder 26 if the latter was previously compressed.

The two hydraulic cylinders 26 of an actuation arrangement 6A, 6B are connected to one another via a hydraulic transmission (not shown) in order that the movement of a movable carriage 17 in one direction, for example forward for that bearing the pedal 12AG as shown by the arrow F1 in FIG. 3, causes the other carriage to move in the other direction, for example backward for the movable carriage 17 bearing the pedal 12AD as shown by an arrow F4 in FIG. 3.

Actuation of the movable carriage 17 bearing the pedal 12AG in the direction of the arrow F1, illustrating a direction command action, thus produces an opposite actuation of the movable carriage 17 bearing the pedal 12AD in the direction of the arrow F4, due to an extension of the corresponding hydraulic cylinder 26, as illustrated by an arrow F5 in FIG. 3.

Furthermore, in the example shown in FIGS. 2 and 3, for an aircraft piloted by two pilots, the four hydraulic cylinders 26 (specifically one hydraulic cylinder 26 associated with each one of said four pedals 12AG, 12AD, 12BG, 12BD) intended for the direction command are connected to one another such that:

both pedals of each pair of pedals are controlled in the above-described manner, inversely; and the two pairs of pedals are controlled, symmetrically, such that the pedals intended for one of the pilots, for example the co-pilot, are always in the same position as those intended for the other pilot.

Thus, the movement of the movable carriages of one actuation arrangement, for example the actuation arrangement 6A, under the action of the associated pair of pedals, produces the same movement of the movable carriages of the other actuation arrangement (in this example the actuation arrangement 6B), causing the other pair of pedals to move in a similar fashion.

Furthermore, each actuation arrangement 6A, 6B comprises an adjustment arrangement (not shown) which preferably comprises an adjustment and locking rack, and which is configured so as to allow an operator to change the neutral (non-actuated) position of the pedals 12AG, 12AD, 12BG, 12BD on their respective frames.

The neutral position of a pedal is the position of the pedal when the pilot is exerting no pressure thereon.

This adjustment arrangement thus makes it possible to move the pedals closer to or further from the pilot's seat in order to adapt this arrangement to the height of the pilot who is to use it.

Figure 4:
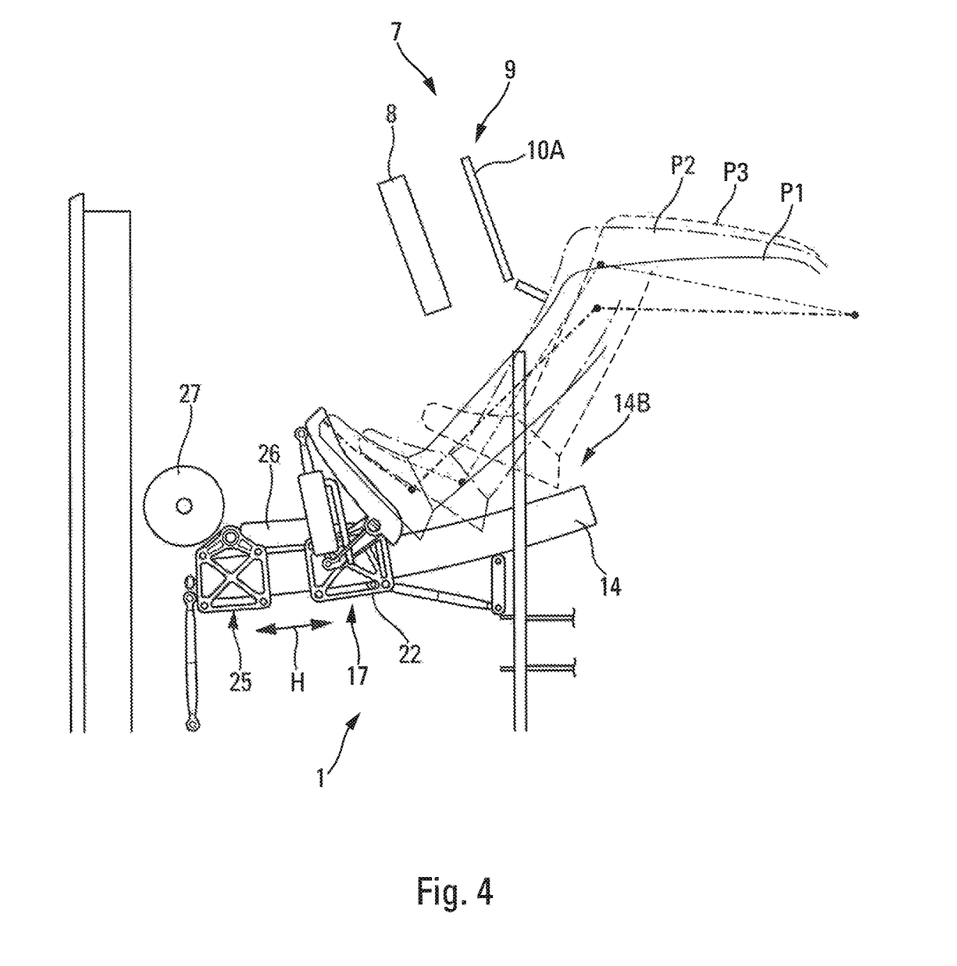
FIG. 4 shows, schematically, various possible adjustment positions of a pedal of a rudder bar.

FIG. 4 shows three different positions, P1, P2 and P3, of the leg of a pilot, which may correspond to 3 pilots of different heights. The actuation arrangement may be positioned by means of the adjustment arrangement in order that the neutral position of the pedals is suitable for the feet in each one of these positions P1, P2 and P3. To that end, the movable arrangement comprising in particular the movable carriage 17 and the auxiliary structure 25 may be moved in either one of the directions illustrated by the double arrow H.

The curvilinear rudder bar 1, having concave curvature, is advantageous for a short pilot, in contrast to a rudder bar of the convex type, since the curvature at its rear end 14B naturally approaches the feet of the pilot (moving away from the floor as indicated hereinabove).

Furthermore, said actuation arrangement 6A, 6B also comprises a reel 27 (shown highly schematically, in particular in FIG. 3) for one or more hydraulic hoses, by means of which it is possible to roll up and unroll a variable length of hydraulic hose(s), in order to adapt the latter to the position of the actuation arrangement, in particular when changing the position, as indicated hereinabove. These hydraulic hoses are used for a hydraulic transmission, with a view to a direction or braking command.

Furthermore, as shown in greater detail by way of illustration for the pedal 12AG in FIG. 5, each pedal is mounted so as to be able to rotate, at a lower end 29, about the axis of rotation 30, for a braking command.

Thus, when the pilot presses his or her foot against the upper end 31 of the pedal 12AG, as shown by an arrow G1 in FIG. 5, the pedal 12AG pivots about the axis 30 as shown by an arrow G2 and compresses an associated hydraulic cylinder 32, as shown by an arrow G3. This associated hydraulic cylinder 32 is mounted in articulated fashion to the upper portion 31 of the pedal 12AG at one end, and to a connecting arm 34 at the other end. The connecting arm 34 is mounted in articulated fashion to the axis 30 at one end, and to the lower end of the hydraulic cylinder 32 at the other end. The connecting arm 34, the hydraulic cylinder 32 and the pedal 12AG thus form a triangle having articulated vertices, thus making it possible, in particular, to simplify the arrangement. The order of braking is determined by the movement of the piston of the hydraulic cylinder 32 (for example by means of a linear inductive sensor), which movement is generated by the actuation of the pedal 12AG. Furthermore, a transfer of fluid, resulting from this actuation, is used to coordinate, in the same position, the equivalent pedal of the second pilot, with the purpose of indicating in real time to this second pilot the braking tendency, so as to avoid the latter braking in opposition in the event of assistance.

In one preferred embodiment, the braking and direction functions are thus implemented by fluid-transfer hydraulic devices.

As a variant, the braking and direction functions may also be implemented with conventional articulated means, using rods and other articulations.

Furthermore, said frame 14 is provided with an attachment arrangement 35 comprising at least two rods 36 and 37 and a connecting fitting 38.

Figure 7B:
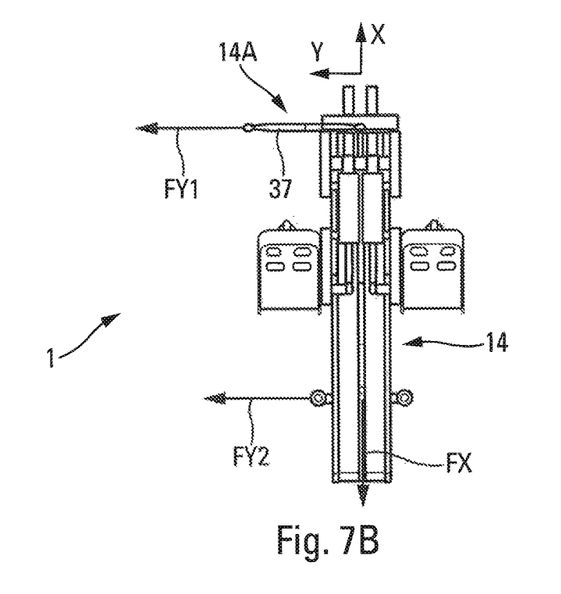

In the particular embodiment shown in FIGS. 7A and 7B, each frame 14 is attached at the front 14A by the intermediary of the two rods 36 and 37, which are connected to structural elements of the aircraft (not shown), being preferably positioned at right angles. The rod 36 is positioned along the vertical direction Z and the rod 37 is positioned along the lateral direction Y, as shown in particular in FIG. 7A.

Furthermore, the chassis 14 is attached near its rear end 14B via the intermediary of the connecting fitting 38, which is for example connected to a joist 39 (shown schematically) of the floor. This connecting fitting 38 is arranged at a distance from the rear end 14B of the frame 14.

The attachment arrangement 35 is moreover provided with a stiffening rod 40. One (40A) of the ends 40A and 40B of the stiffening rod 40 is attached below the frame 14 and the other end 40B is connected to the connecting fitting 38. This stiffening rod 40 makes it possible, in particular, to mechanically strengthen the frame 14. It makes it possible, together with the connecting fitting 38, to prevent the rudder bar as a whole from moving in the longitudinal direction X.

This produces a semi-aerial isostatic mounting. FIGS. 7A and 7B show, by way of arrows, the reactions at the structural supports, specifically:
  a reaction FX in the X direction at the connecting fitting 38;
  reactions FY1 and FY2 in the Y direction, respectively at the rod 37 and the connecting fitting 38; and
  reactions FZ1, FZ2 and FZ3 in the Z direction, respectively at the rod 36 and the connecting fitting 38.

The rudder bar 1 also comprises conventional means (not shown) for implementing the usual functions of a rudder bar relating to the following parameters: control, coordination, sensors, signals.

The rudder bar 1 thus in particular comprises conventional means for generating the command corresponding to the actuation of the pedals. In particular, the rudder bar may comprise a direction sensor (not shown) which is configured to measure the direction and amplitude of the movement of the pedals of an actuation arrangement as a consequence of a pilot acting on the pedals. The direction sensor transforms, in a conventional manner, the mechanical command representing the movement of the movable carriages into an electrical signal. This electrical signal is then sent, in a conventional manner, to a direction system (not shown) of the rudder 3 (FIG. 1) in order to control the direction of the aircraft.

The rudder bar also comprises a transmission arrangement which is configured so as to transmit a movement, when a pedal is pivoted about the axis of rotation 30 (FIG. 5). To that end, the transmission arrangement is connected to a braking control unit (not shown). When the transmission arrangement is controlled, it transmits a mechanical command to the braking control unit which transforms this mechanical command into an electrical signal, this electrical signal being then transmitted to an activation system (not shown) that is configured to activate the brakes 5 of the aircraft AC (FIG. 1). The movement transmission arrangement for controlling braking may comprise means of various types, such as an inductive linear sensor or an articulated-arm rotary sensor, for example.

The above description, given principally with reference to a single pedal, applies to each one of the pedals of the rudder bar 1 and to their associated means.

The rudder bar 1 as described hereinabove therefore has a simplified architecture. This architecture comprises no articulated elements. Movements are obtained by rolling on a curvilinear rail. This architecture is simple and lightweight and makes it possible to increase travel with no real limitation, while at the same time providing great mechanical strength. Furthermore, this rudder bar may be installed in any aircraft, particularly since it is simple to position. Furthermore, it retains the same functionalities as a conventional rudder bar.

The operation of the above-described rudder bar 1, for controlling the direction of the aircraft, is as follows.

When a pilot's foot moves the pedal 12AG away from a neutral position, as illustrated by the arrow F1 in FIG. 3, the movement of the pedal 12AG and of the movable carriage 17 on which it is mounted, compresses the cylinder 26 (illustrated by the arrow F3).

The compression of the cylinder 26 is transmitted to the direction sensor. The direction sensor then transforms the detected mechanical command into an electrical signal that is transmitted to the rudder direction system in order to control the direction of the aircraft.

When compared to a conventional rudder bar, the ergonomics and functionalities of the rudder bar 1 are practically identical.

As a variant, it is possible to realize more conventional architectures on a curvilinear frame as described hereinabove, but fluid-transfer architectures are simplest to integrate.

The architecture of the rudder bar 1 as described hereinabove has numerous advantages. In particular:
  this architecture means that the floor is no longer subject to the specific stresses of the rudder bar, such that the floor is simplified, and that it is possible to make all of this into one module, and it comprises an integration resulting in a substantial saving in terms of volume;

it is simpler to produce and uses fewer parts. This results in substantial simplification and saving in terms of mass;

it also has easier integration of the rudder bar and of the associated elements, in particular in a semi-aerial mode with a rear portion raised slightly above the floor;

it is more compact and less costly;

it retains essentially the same functionalities and ergonomics as a conventional rudder bar;

the travel of the pedals is adaptable and greater, and it is concave, which favors a short pilot without penalizing a tall pilot;

it has a discrete number of connecting points (iso static mounting); and it generates evolving trajectories (since it is not mechanically connected to a pendular effect about a center of rotation).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rudder bar for an aircraft, said rudder bar comprising at least one actuation arrangement having first and second pedals,
   wherein said actuation arrangement comprises:
   at least one frame, said frame having first and second rails, each one of said first and second rails being in the form of a concave curve; and
   associated with said first and second rails, a first and second movable carriage, respectively, each one of said first and second movable carriages bearing one of said first and second pedals, each one of said first and second movable carriages being configured to be moved on the associated rail, for a direction command, under an action exerted by at least one foot of a pilot on at least one of said first and second pedals wherein each one of said first and second movable carriages is connected to a cylinder arranged along the associated rail.

2. The rudder bar as claimed in claim 1, wherein said frame has an elongate general shape.

3. The rudder bar as claimed in claim 1, wherein each one of said first and second movable carriages has an arrangement of rollers mounted so as to be able to rotate and are configured so as to be able to move on the associated rail.

4. The rudder bar as claimed in claim 1, wherein said frame is provided with structural tubes.

5. The rudder bar as claimed in claim 1, wherein said actuation arrangement comprises an adjustment arrangement configured so as to allow an operator to modify the neutral positions of the pedals.

6. The rudder bar as claimed in claim 1, wherein said frame has an attachment arrangement, said attachment arrangement comprising two rods secured at right angles with respect to one another at one end, referred to as the front end, of the frame at one end of the frame, and a connecting fitting provided with a stiffening rod and is secured to the other end of the frame.

7. The rudder bar as claimed in claim 1, wherein each one of said first and second pedals is mounted so as to be able to rotate on the associated movable carriage for a braking command.

8. The rudder bar as claimed in claim 7, wherein each one of said first and second pedals is connected to a hydraulic cylinder and to a connecting arm, forming an articulated triangle.

9. The rudder bar as claimed in claim 1, wherein said actuation arrangement comprises hydraulic fluid-transfer devices for at least one of the following commands: a direction command and a braking command.

10. An aircraft, comprising a rudder bar comprising:
    at least one actuation arrangement having first and second pedals,
    wherein said actuation arrangement comprises:
    at least one frame, said frame having first and second rails, each one of said first and second rails being in the form of a concave curve; and
    associated with said first and second rails, a first and second movable carriage, respectively, each one of said first and second movable carriages bearing one of said first and second pedals, each one of said first and second movable carriages being configured to be moved on the associated rail, for a direction command, under an action exerted by at least one foot of a pilot on at least one of said first and second pedals wherein each one of said first and second movable carriages is connected to a cylinder arranged along the associated rail.

11. The aircraft as claimed in claim 10, comprising a cockpit having a floor, wherein said frame is positioned such that a rear end thereof, located to the rear with respect to the direction of flight of the aircraft, is raised above the floor of the cockpit.

12. The aircraft as claimed in claim 11, wherein said frame is secured at a front end thereof, via two rods arranged at right angles with respect one another, to at least one structural element, and at the rear end thereof, via a connecting fitting, to a joist of the floor of the cockpit, the connecting fitting being provided with a stiffening rod.

* * * * *